United States Patent
Winter et al.

(10) Patent No.: US 8,137,060 B2
(45) Date of Patent: Mar. 20, 2012

(54) ACTUATION OF A TURBOFAN ENGINE BIFURCATION TO CHANGE AN EFFECTIVE NOZZLE EXIT AREA

(75) Inventors: Michael Winter, New Haven, CT (US); Ashok K. Jain, Tempe, AZ (US)

(73) Assignee: United Technologies Corporation, Hartford, CT (US)

(*) Notice: Subject to any disclaimer, the term of this patent is extended or adjusted under 35 U.S.C. 154(b) by 587 days.

(21) Appl. No.: 12/441,576

(22) PCT Filed: Oct. 12, 2006

(86) PCT No.: PCT/US2006/039802
§ 371 (c)(1),
(2), (4) Date: Mar. 17, 2009

(87) PCT Pub. No.: WO2008/045053
PCT Pub. Date: Apr. 17, 2008

(65) Prior Publication Data
US 2009/0252600 A1  Oct. 8, 2009

(51) Int. Cl.
*F01D 17/00* (2006.01)
(52) U.S. Cl. ............................................ 415/145; 415/1
(58) Field of Classification Search ............... 415/1, 145
See application file for complete search history.

(56) References Cited

U.S. PATENT DOCUMENTS

| | | | |
|---|---|---|---|
| 4,275,560 A * | 6/1981 | Wright et al. | 60/226.3 |
| 5,833,140 A * | 11/1998 | Loffredo et al. | 239/265.37 |
| 6,820,410 B2 | 11/2004 | Lair | |
| 6,983,588 B2 | 1/2006 | Lair | |
| 2004/0187476 A1 | 9/2004 | Lair | |
| 2006/0078419 A1 | 4/2006 | Swanson et al. | |

FOREIGN PATENT DOCUMENTS

| | | |
|---|---|---|
| EP | 0 848 152 | 6/1998 |
| WO | 03/060312 | 7/2003 |

OTHER PUBLICATIONS

International Search Report for PCT Application No. PCT/US2006/039802, Aug. 22, 2008.

* cited by examiner

*Primary Examiner* — David S Blum
(74) *Attorney, Agent, or Firm* — Carlson, Gaskey & Olds, P.C.

(57) ABSTRACT

The invention relates to a turbine engine that includes a spool supporting at least one of a compressor and a turbine. A turbofan is coupled to the spool The spool is arranged in a core nacelle, and the turbofan is arranged upstream from the core nacelle. A fan nacelle surrounds the turbofan and the core nacelle and provides a bypass flow path. A structure extends radially between the core and fan nacelles to support the core nacelle relative to the fan nacelle. Surfaces are supported relative to the fixed structure and are moveable between closed and open positions to selectively obstruct bypass flow through the bypass flow path, thereby changing the effective area of the exit nozzle. A change in the effective area of the nozzle exit can be used to improve the efficiency and operation of the turbine engine.

10 Claims, 2 Drawing Sheets ially fixed, closed struc-
ACTUATION OF A TURBOFAN ENGINE BIFURCATION TO CHANGE AN EFFECTIVE NOZZLE EXIT AREA This application claims priority to PCT Application Serial No. PCT/US2006/039802, filed on Oct. 12, 2006.

BACKGROUND OF THE INVENTION

This invention relates to an apparatus and method for changing an effective nozzle exit area of a turbofan engine.

A typical turbofan engine includes a core nacelle housing one or more spools supporting at least one compressor and turbine. One of the spools is used to rotationally drive a turbofan arranged upstream from the core nacelle. A fan nacelle surrounds the turbofan and the core nacelle. The core nacelle is supported by several bifurcations to centrally locate the core nacelle relative to the fan nacelle. In addition to supporting the core nacelle, the bifurcations are used to house various components, such as bleed air conduits and wires, for example. The bifurcations are typically fixed, closed structures.

A generally annular bypass flow path is arranged between the core and fan nacelles through which bypass air from the turbofan flows. The bifurcations are arranged in the bypass flow path. The bypass flow exits from a nozzle exit area at the rear of the engine. The nozzle exit area is typically fixed in a turbofan engine.

Non-turbofan aircraft turbine engines have been developed that change the effective nozzle exit area to affect the efficiency and operation of the engine. In military aircraft, for example, multiple circumferentially arranged flaps at the exit of the engine nozzle are rotated inwardly and outwardly in a radial direction to change the physical size of the nozzle's exit area. This arrangement adds additional weight and cost to the engine externals. Many flaps are required as well as associated actuators. Further, the moveable flaps are external and subject to damage from foreign objects.

What is needed is a turbofan engine capable of changing the effective nozzle exit area using existing engine structure and surfaces.

SUMMARY OF THE INVENTION

The invention relates to a turbine engine that includes a spool supporting at least one of a compressor and a turbine. A turbofan is coupled to the spool. The spool is arranged in a core nacelle, and the turbofan is arranged upstream from the core nacelle. A fan nacelle surrounds the turbofan and the core nacelle and provides a bypass flow path. In one example, a fixed structure or bifurcation extends radially between the core and fan nacelles to support the core nacelle relative to the fan nacelle.

In one example, opposing surfaces are supported relative to the bifurcation and are moveable between closed and open positions to selectively obstruct bypass flow through the bypass flow path, thereby changing the effective area of the nozzle. A change in the effective area of the nozzle can be used to improve the efficiency and operation of the turbine engine. In one example, the opposing surfaces are manipulated in generally circumferential and axial directions about one or more pivots in an arc in response to a controller commanding an actuator under predetermined conditions.

These and other features of the present invention can be best understood from the following specification and drawings, the following of which is a brief description.

DETAILED DESCRIPTION OF THE PREFERRED EMBODIMENT

Figure 1:
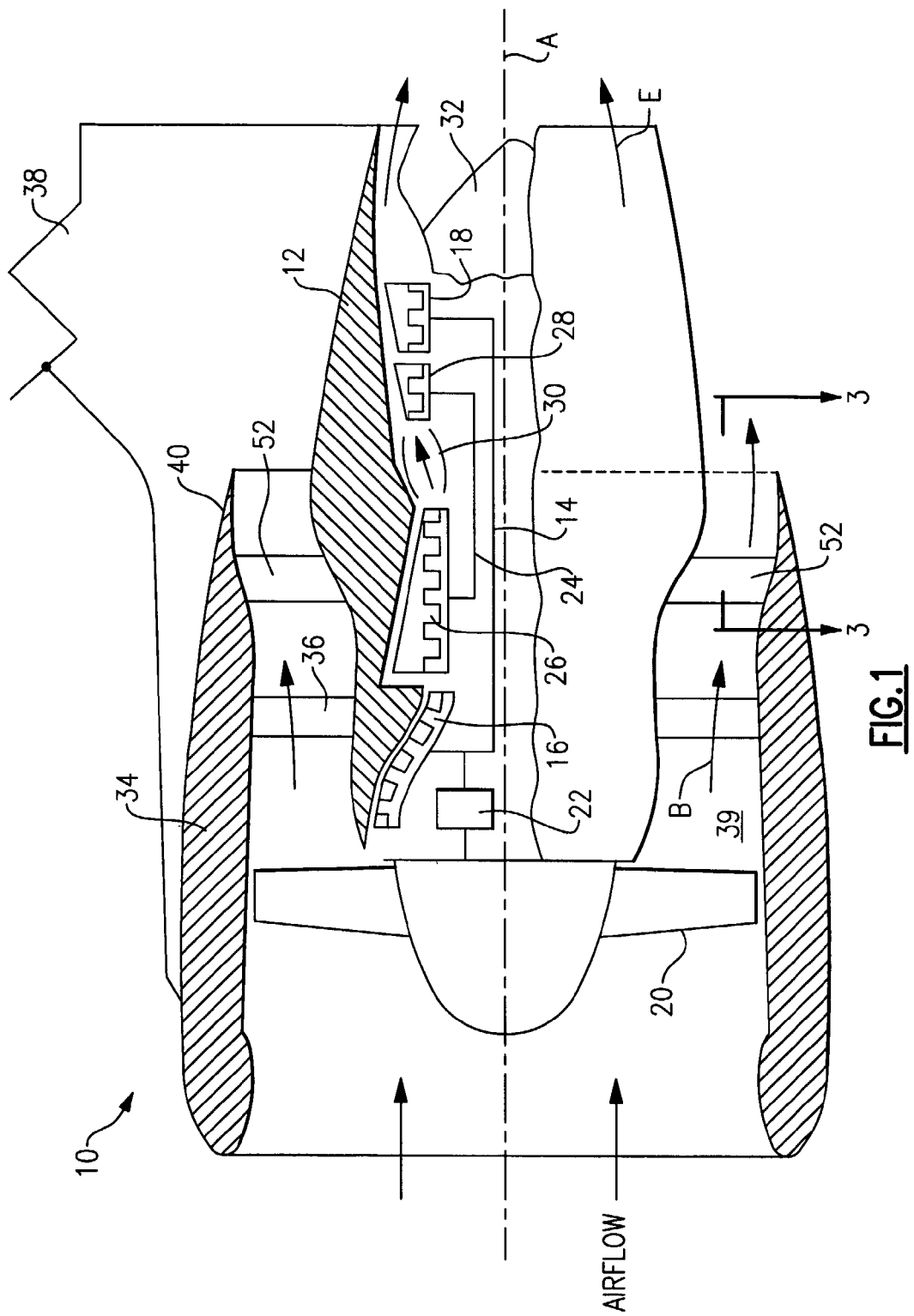
FIG. 1 is a cross-sectional view of an example geared turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 (FIGS. 3A and 3B) that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the exit nozzle area 40.

Figure 2:
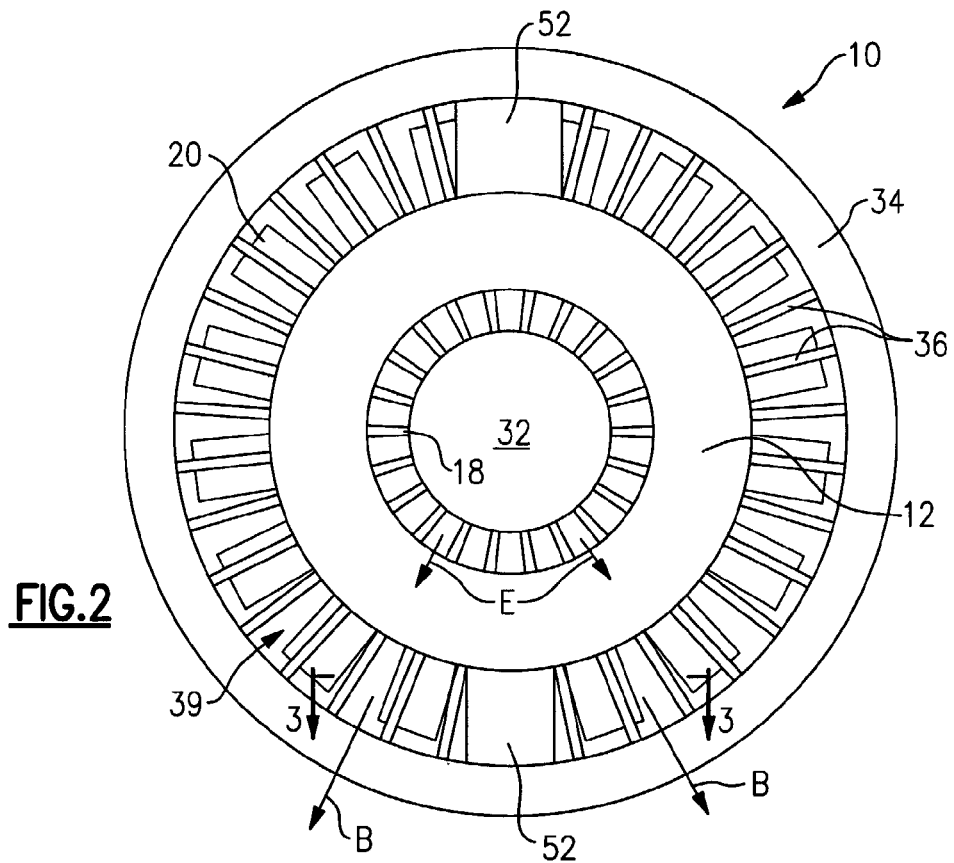
FIG. 2 is a front, cross-sectional view of the engine shown in FIG. 1.

In the example shown in FIGS. 1 and 2, opposing bifurcations 52 radially extend between the core and fan nacelles 12, 34 to support the core nacelle 12 relative to the fan nacelle 34. Typically, bleed lines and other connections are housed within the bifurcations 52 to connect the core nacelle 12 and its components with other areas of the aircraft. The bifurcations 52 are arranged inside the fan nacelle 34 and are not exposed to potentially destructive foreign objects.

The flow control device 41 is used to change the effective nozzle exit area, although the nozzle exit area 40 is fixed. In the examples shown, this is achieved by moving one or more surfaces supported, for example, by the bifurcation 52 to selectively obstruct portions of the bypass flow B through the bypass flow path 39. Any surface or surfaces exposed to the bypass flow path B can be used instead of or in addition to the bifurcation surfaces shown in FIGS. 3A and 3B.

Figure 3A:
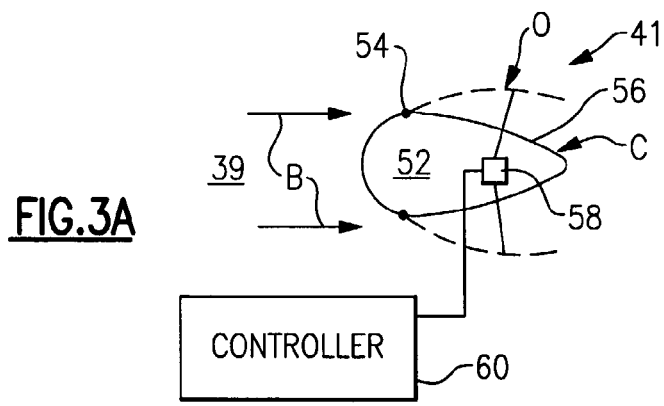
FIG. 3A is one example flow control device taken along line 3-3 in FIG. 1 and used to selectively change the effective nozzle exit area.

In one example shown in FIG. 3A, opposing surfaces 56 connected to the bifurcations 52 by pivots 54 near a leading edge are moved by an actuator 58 between closed and open positions C, O. The pivot 54 is arranged on one end of opposing ends of each surface 56. A single actuator is shown schematically connected to the surfaces 56 by linkages. However, other configurations can be used. The surfaces 56 move in an arc in generally axial and circumferential directions in the examples shown. The actuator 58 is commanded by a controller 60 under predetermined conditions to change the effective nozzle exit area with the surfaces 56 to improve the efficiency and operation of the turbine engine 10.

Figure 3B:
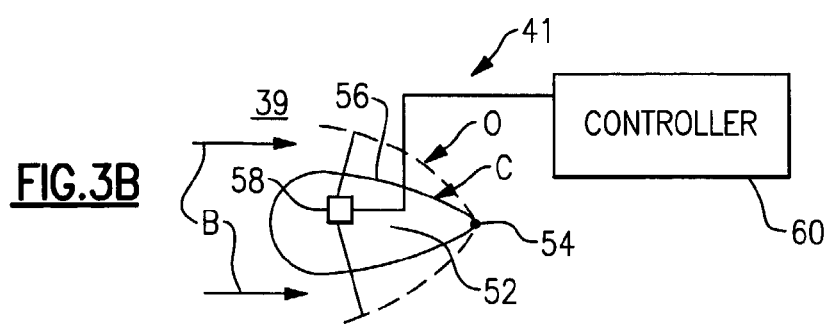
FIG. 3B is another example flow control device.

In another example shown in FIG. 3B, the opposing surfaces 56 pivot near a trailing edge of the bifurcation 52. The arrangement shown in FIG. 3B may create a greater disturbance in the bypass flow B for the same actuated distance as compared to the arrangement shown in FIG. 3A.

In this manner, the control device 41 uses surfaces of existing engine structures in the turbine engine to minimize the additional weight and cost associated with providing a change in the effective nozzle exit area.

Although example embodiments of this invention have been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
   a spool supporting a turbine;
   a turbofan arranged upstream from the core nacelle and coupled to the spool;
   a fan nacelle surrounding the turbofan and providing a bypass flow path between the fan and core nacelles having a nozzle exit area;
   a flow control device including a surface in the bypass flow path movable between closed and open positions to effectively change the nozzle exit area; and
   a bifurcation extending between the core and fan nacelles to support the core nacelle relative to the fan nacelle, the surface supported on the bifurcation, wherein the bifurcation supports opposing surfaces on opposing sides of the bifurcation, each of the opposing surfaces having leading and trailing edges, each opposing surface movable about a pivot near the trailing edge between the closed and open positions in a generally circumferential direction.

2. The turbine engine according to claim 1, wherein the flow control device includes a controller programmed to initiate movement of the surface between the closed and open positions in response to a predetermined condition.

3. The turbine engine according to claim 2, wherein the flow control device includes an actuator interconnected to the surface and communicating with the controller, the actuator adapted to receive a command from the controller in response to the predetermined condition.

4. A method of changing the effective nozzle exit area of a turbine engine comprising the steps of:
   a) providing a bypass flow path circumventing a core nacelle; and
   b) moving opposing surfaces in the bypass flow path using a single actuator operatively connected to the opposing surfaces to effectively change a nozzle exit area associated with the bypass flow path.

5. The method according to claim 4, wherein step b) includes moving the surface between open and closed positions in response to a predetermined condition.

6. The method according to claim 4, comprising the step of supporting the surface on a bifurcation extending between the core nacelle and the fan nacelle.

7. The method according to claim 4, wherein step b) includes moving the surface generally circumferentially outward from the closed position to the open position.

8. The method according to claim 4, wherein step b) includes moving the surface generally axially between the open and closed positions.

9. The method according to claim 5, wherein step b) includes partially obstructing the bypass flow path with the surface in the open position.

10. The method according to claim 9, comprising opposing surfaces, and step b) includes moving the opposing surfaces away from one another when moving from the closed position to the open position.

* * * * *